(12) United States Patent
Schwartz et al.

(10) Patent No.: US 9,229,253 B2
(45) Date of Patent: Jan. 5, 2016

(54) ELECTRONICALLY SWITCHABLE PRIVACY FILM AND DISPLAY DEVICE HAVING SAME

(71) Applicant: 3M INNOVATIVE PROPERTIES COMPANY, St. Paul, MN (US)

(72) Inventors: Evan L. Schwartz, Vadnais Heights, MN (US); Mark J. Pellerite, Woodbury, MN (US); Daniel W. Hennen, Cottage Grove, MN (US); Marc D. Radcliffe, Newport, MN (US); Michael L. Steiner, New Richmond, WI (US); Marie A. Boulos, West Saint Paul, MN (US); Michael E. Lauters, Hudson, WI (US); Gary T. Boyd, Woodbury, MN (US); John P. Baetzold, North Saint Paul, MN (US); John J. Stradinger, Roseville, MN (US); Vivian W. Jones, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 95 days.

(21) Appl. No.: 14/348,272

(22) PCT Filed: Sep. 20, 2012

(86) PCT No.: PCT/US2012/056221
§ 371 (c)(1),
(2) Date: Mar. 28, 2014

(87) PCT Pub. No.: WO2013/048847
PCT Pub. Date: Apr. 4, 2013

(65) Prior Publication Data
US 2014/0232960 A1  Aug. 21, 2014

Related U.S. Application Data

(60) Provisional application No. 61/541,245, filed on Sep. 30, 2011.

(51) Int. Cl.
*G02F 1/1335* (2006.01)
*G02F 1/13* (2006.01)
(Continued)

(52) U.S. Cl.
CPC ............... *G02F 1/1323* (2013.01); *B32B 3/30* (2013.01); *B32B 15/02* (2013.01); *B32B 27/06* (2013.01);
(Continued)

(58) Field of Classification Search
CPC ............ G02F 1/1323; G02F 1/133606; G02F 1/133504; G02F 1/133512; G02F 1/13476; G02F 1/134309; G02F 1/1347; G02F 1/1335; G02F 1/133611; G02F 1/0063; G02F 1/133509; G02F 1/17; G02F 1/137; G02F 2001/133562; G02F 2001/133607; G02F 2201/50; G02F 2201/08; G02F 2203/62; G02B 5/003; G02B 5/0242; G02B 5/22; G02B 5/20; G02B 27/30; G02B 2207/123; B32B 2457/202; G09G 2320/068; G09G 2320/028; G09G 2320/062; G09G 3/3648; G09G 3/003; G09G 3/36; G09G 2300/0486; Y10T 428/24537; Y10T 428/2457; Y10T 428/2462; C09K 19/02
USPC ......... 349/96, 62, 61, 33, 112, 123, 156, 104, 349/105, 35, 169, 193, 84, 110, 86, 179, 349/185, 186, 12; 359/613, 614, 641, 885, 359/227, 292, 601, 890, 891; 345/87
See application file for complete search history.

(56) References Cited

U.S. PATENT DOCUMENTS 4,766,023 A    8/1988  Lu et al.
(Continued)

FOREIGN PATENT DOCUMENTS

JP    2007-206373       8/2007
WO    WO 2008/046058 A3   4/2008
WO    WO 2012/145157 A1  10/2012

OTHER PUBLICATIONS

International Search Report for PCT International Application No. PCT/US2012/056221, mailed Mar. 18, 2013, 4 pages.
(Continued)

*Primary Examiner* — Thoi Duong
(74) *Attorney, Agent, or Firm* — Daniel J. Iden

(57) ABSTRACT

An electronically switchable privacy films suitable for use in display devices are described. The electronically switchable privacy film comprises a pair of mutually opposing transparent electrodes; an optically transparent microstructured layer disposed between the transparent electrodes, the microstructured layer comprising a plurality of microstructured ribs extending across a surface thereof such that the microstructured ribs form an alternating series of ribs and channels; and electronically switchable material disposed in the channels, the electronically switchable material being capable of modulation between high and low absorption states upon application of an electric field across the transparent electrodes.

20 Claims, 6 Drawing Sheets

(51) Int. Cl.
  *G02B 26/00* (2006.01)
  *G02F 1/1334* (2006.01)
  *B32B 3/30* (2006.01)
  *B32B 15/02* (2006.01)
  *B32B 27/06* (2006.01)
  *G02F 1/1333* (2006.01)
  *G02F 1/137* (2006.01)
  *G02F 1/15* (2006.01)
  *G02F 1/161* (2006.01)
  *G02F 1/17* (2006.01)

(52) U.S. Cl.
  CPC ............ *G02B 26/004* (2013.01); *G02F 1/1334* (2013.01); *B32B 2307/412* (2013.01); *B32B 2457/208* (2013.01); *G02F 1/13725* (2013.01); *G02F 1/133377* (2013.01); *G02F 1/133524* (2013.01); *G02F 1/15* (2013.01); *G02F 1/161* (2013.01); *G02F 1/17* (2013.01)

(56) References Cited

U.S. PATENT DOCUMENTS

| | | |
|---|---|---|
| 5,156,452 A | 10/1992 | Drzaic et al. |
| 6,301,038 B1 | 10/2001 | Fitzmaurice et al. |
| 6,398,370 B1 | 6/2002 | Chiu et al. |
| 6,870,657 B1 | 3/2005 | Fitzmaurice et al. |
| 8,012,567 B2 | 9/2011 | Gaides et al. |
| 8,213,082 B2 | 7/2012 | Gaides et al. |
| 8,441,707 B2 | 5/2013 | Lam et al. |
| 8,503,122 B2 | 8/2013 | Liu et al. |
| 2005/0174529 A1 | 8/2005 | Fukushima |
| 2005/0219445 A1 | 10/2005 | Kubo |

OTHER PUBLICATIONS

Supplementary European Search Report (Apr. 3, 2015) 2 pges; Re: EP Application 12834900.8.

ELECTRONICALLY SWITCHABLE PRIVACY FILM AND DISPLAY DEVICE HAVING SAME

FIELD OF INVENTION

This disclosure relates to optical films, particularly privacy films which can be used with electronic display devices.

BACKGROUND

Privacy films are known in the art of electronic display devices. A viewer can apply a privacy film to the viewing surface of an electronic display device such that images can be viewed selectively. Typically, when the viewer is positioned within a range of small viewing angles relative to the normal of the surface of the privacy film, images being displayed are viewable through the film. As the position of the viewer changes such that the viewing angle increases relative to the normal, the amount of light transmitted through the privacy film decreases until a maximum viewing angle is reached and images being displayed are no longer viewable.

SUMMARY

An electronically switchable privacy film is disclosed. The film can be used in a privacy mode when a user wishes to restrict viewing of information being displayed by an electronic display device. When the user wishes to share information being displayed, the electronically switchable privacy film can be switched to a public mode for sharing. The viewer can switch back and forth between modes without having to physically remove the film from the viewing surface of the display device.

The electronically switchable privacy film can be used in different ways. For example, the film may be applied to the viewing surface of a display device and powered by a USB adapter with the use of a built-in transformer circuit. The electronically switchable privacy film may also be incorporated into a display device during manufacture of the device, for example, between a display panel and an outer viewing surface of the device, such as a touch screen. When built into a display device, the power for the privacy film could be drawn from a battery or electrical outlet. Such a display device would have built-in public and privacy modes, and a consumer would not need to purchase and install a separate privacy film.

The electronically switchable privacy film comprises a pair of mutually opposing transparent electrodes and an optically transparent microstructured layer disposed between the transparent electrodes, the microstructured layer comprising a plurality of microstructured ribs extending across a surface thereof such that the microstructured ribs form an alternating series of ribs and channels. The film comprises electronically switchable material disposed in the channels of the microstructured layer. The electronically switchable material is capable of modulation between high and low absorption states upon application of an electric field across the transparent electrodes. The electronically switchable privacy film preferably comprises certain transmission properties. When the electric field is not applied, the film is in a privacy mode such that it has a light transmission of less than about 10% at a viewing angle of 30°. When the electric field is applied, the film is in the share mode such that it has an increase in light transmission and the difference in transmission between the privacy mode and share mode is at least 5% for viewing angles from about 30 to about 45°. The film has a light transmission of at least about 25% in share and privacy modes at viewing angles from 0 to about 15°. These and other aspects of the invention are described in the detailed description below. In no event should the above summary be construed as a limitation on the claimed subject matter.

BRIEF DESCRIPTION OF THE DRAWINGS

The invention may be more completely understood in consideration of the following detailed description in connection with the following figures. The figures are not necessarily drawn to scale.

DETAILED DESCRIPTION

Privacy films are known and are purchased generally as aftermarket items for use with electronic display devices, particularly when one does not want others to see the contents of the screen. A user physically applies the privacy film to the viewing surface of his display device, and the information being displayed on the viewing surface can be viewed only within a range of angles referred to herein as "viewing angle". Typically, the viewing angle is some range of angles centered on an axis normal to the privacy film, for example, 0°+/−30°. Many types of privacy films can be characterized as "static" privacy films having a single privacy mode. If the viewing surface is covered with a static privacy film, and the user wants others to see the contents of the screen, the privacy film needs to be physically removed from the surface and stored in a location where it does not become damaged.

One type of static privacy film comprises a transparent louver film disposed on a polymeric substrate, with light absorbing material disposed in channels formed between the louvers such that alternating transparent and light absorbing regions are formed. The transparent and light absorbing regions are relatively positioned to provide a restricted viewing angle. An exemplary privacy film of this type is described in U.S. Pat. No. 6,398,370 B1 (Chiu et al.).

The electronically switchable privacy film disclosed herein is different from a conventional privacy film, such as a static privacy film, because a user can switch between share and privacy modes without having to remove the film from the viewing surface of his display device. Switching can be carried out via an external hardware or software-controlled switch electrically coupled to the film. In some embodiments, in the presence of an electric field, the electronically switchable privacy film is in the share mode, and in the absence of an electric field, the film is in the privacy mode. Thus, a user can switch back and forth between the two modes by changing the strength of the electric field.

Figure 1A:
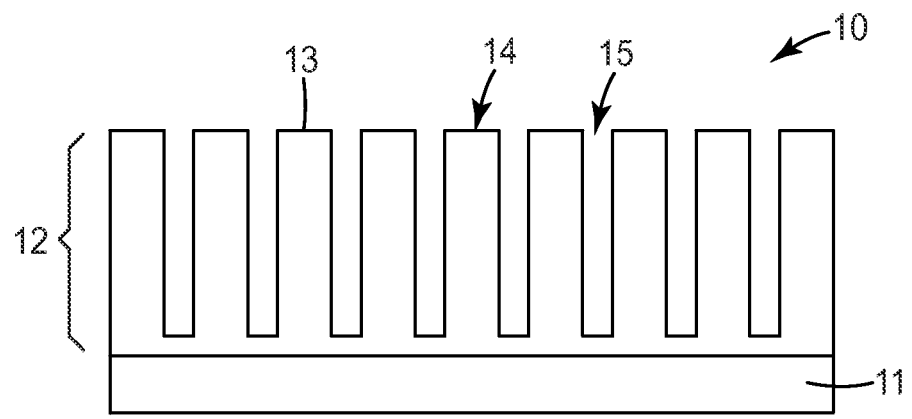
FIGS. 1A and 1B show schematic cross-sectional and perspective views, respectively, of exemplary optical films from which the electronically switchable privacy film can be made.
Figure 1B:
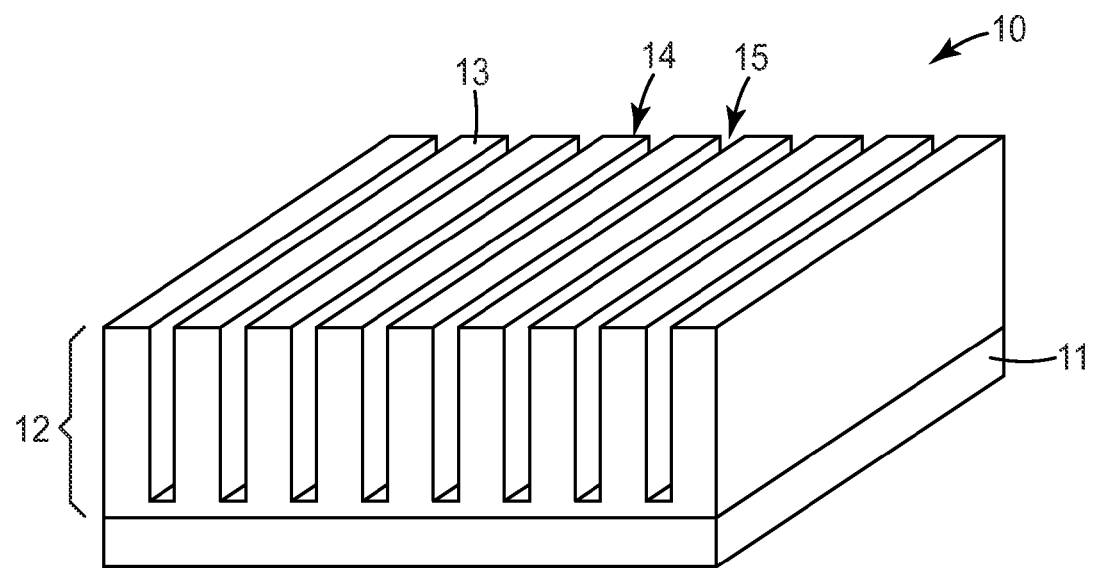

FIG. 1A shows a schematic cross-sectional view of an exemplary optical film from which the electronically switchable privacy film can be made. Optical film 10 comprises transparent electrode 11 and optically transparent microstructured layer 12 disposed on the electrode. The optically transparent microstructured layer comprises a plurality of microstructured ribs 14 extending across surface 13 of the layer. FIG. 1B shows an embodiment of optical film 10 wherein microstructured ribs 14 extend across major surface 13 of the optically transparent microstructured layer such that an alternating series of ribs 14 and channels 15 are formed.

Figure 2:
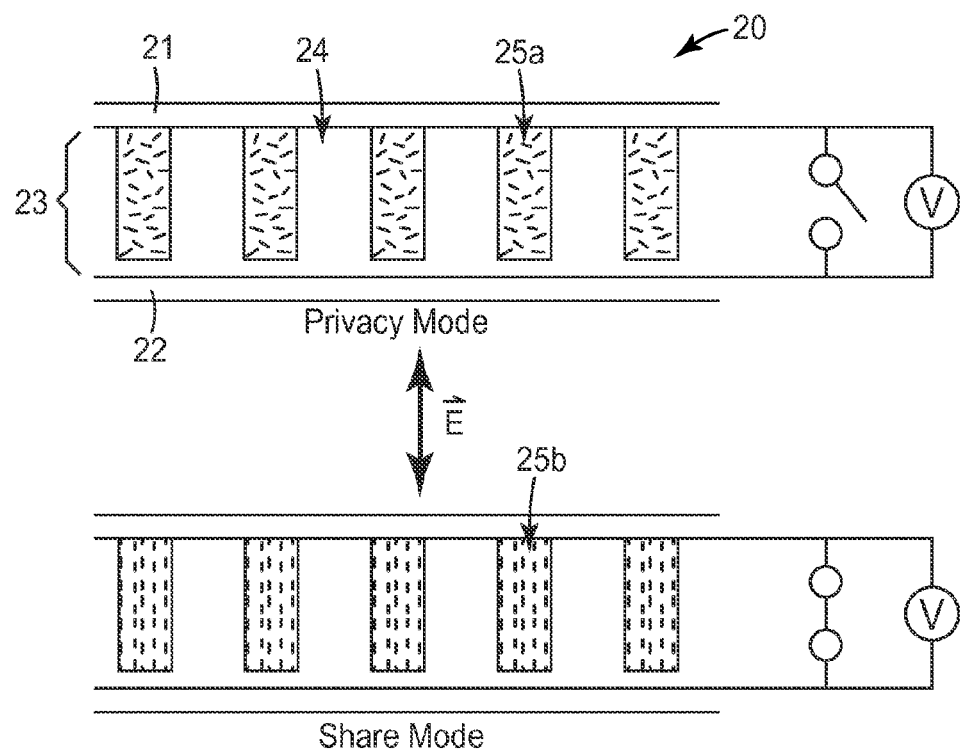
FIG. 2 shows schematic cross-sectional views of an exemplary electronically switchable privacy film illustrating electronic switchability of the film between privacy and share modes.

FIG. 2 shows schematic cross-sectional views of an exemplary electronically switchable privacy film illustrating electronic switchability of the film between privacy and share modes. Electronically switchable privacy film 20 comprises pair of mutually opposing transparent electrodes 21 and 22 and optically transparent microstructured layer 23 disposed between the electrodes. The optically transparent microstructured layer comprises plurality of microstructured ribs 24 extending across a surface of the layer, for example, as shown in FIG. 1B such that an alternating series of ribs 24 and channels comprising electronically switchable material 25 are formed. The electronically switchable material is capable of modulation between high and low absorption states upon application of an electric field across transparent electrodes 21 and 22. For the embodiment shown in FIG. 2, electronically switchable material 25 is shown schematically as rod-like molecules, such as liquid crystals, which can be randomly oriented 25a in the absence of an electric field, and substantially oriented 25b in the presence of an electric field.

Figure 3:
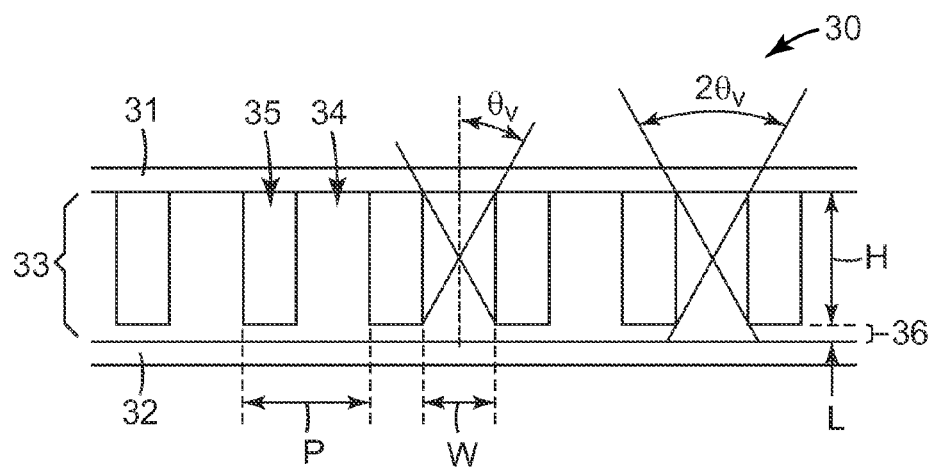
FIGS. 3 and 4 show schematic cross sectional views of exemplary optical films from which the electronically switchable privacy film can be made. Selected geometrical parameters of the films are shown.

Geometrical parameters which influence performance of privacy films have been described, for example, see US 2010/0271721 (Gaides et al.); incorporated herein by reference. Therefore, only a brief explanation of these parameters in the context of privacy film performance is provided. Geometrical parameters described herein are illustrated in FIG. 3. FIG. 3 shows a schematic cross sectional view of an exemplary privacy film 30 comprising optically transparent microstructured layer 33 disposed between opposing transparent electrodes 31 and 32. The optically transparent microstructured layer comprises a plurality of microstructured ribs 34 extending across a surface of the layer, for example, as shown for optical film 10 in FIG. 1B. Channels 35 are formed between adjacent ribs and comprise electronically switchable material (not shown). Each rib/channel has height H, each rib has width W, and pitch P indicates spacing of the channels. Width Y of the channels is P−W. Optically transparent microstructured layer 33 also comprises land 36 having height L such that the thickness of layer 33 is H+L. The spacing and shape of the ribs determine viewing angle $\theta_V$. Rib aspect ratio for layer 33 is defined as H/W, and channel aspect ratio as H/Y.

Parameters H, W, P, Y and L of the optically transparent microstructured layer can have any suitable values as long as the electronically switchable privacy film can function as desired. In general, dimensions of the ribs are selected such that the desired viewing angle is provided by the film. At the same time, it is desirable for the parameters to be selected such that an adequate amount of light can pass through the film and toward the viewer. Smaller channel widths and larger pitch can lead to increased on-axis transmission, while deeper channels lead to increased off-axis optical scattering or absorption.

In some embodiments, each rib has height H from about 10, 15, 20 or 25 to about 150 μm and width W from about 25 to about 50 um. In some embodiments, rib aspect ratio H/W is greater than about 1.5, for example, greater than about 2.0, or greater than about 3.0. For example, each rib may have height H from about 25 to about 150 um and width W from about 25 to about 50 um such that rib aspect ratio H/W is greater than about 1.5.

In some embodiments, each channel has height H from about 25 to about 150 μm and width Y from about 1 to about 50 um. In some embodiments, channel aspect ratio H/Y is greater than 3, 4, or 5. In some embodiments, the channel aspect ratio can be at least 6, 7, 8, 9, or 10. The channel aspect ratio is typically no greater than 50. When the channel aspect ratio is sufficiently high and the channels comprise a light absorbing material such as a dichroic dye, the privacy film exhibits low transmission (e.g. less than about 10%) at a viewing angle of 30° when an electric field in not applied and the film is in (e.g. static) privacy mode. In privacy mode, the transmission typically decreases as the angle increases from 30 to 60 degrees. Hence, when the privacy film exhibits low transmission (e.g. less than about 10%) at a viewing angle of 30°, the film also exhibits low and typically even lower transmission at viewing angles greater than 30°.

The height of the land (L) is typically minimized provided that the land is sufficiently thick such that it can support a large number of ribs, yet thin enough so that it does not interfere with optical and electrical switching performance of the privacy film.

Figure 4:
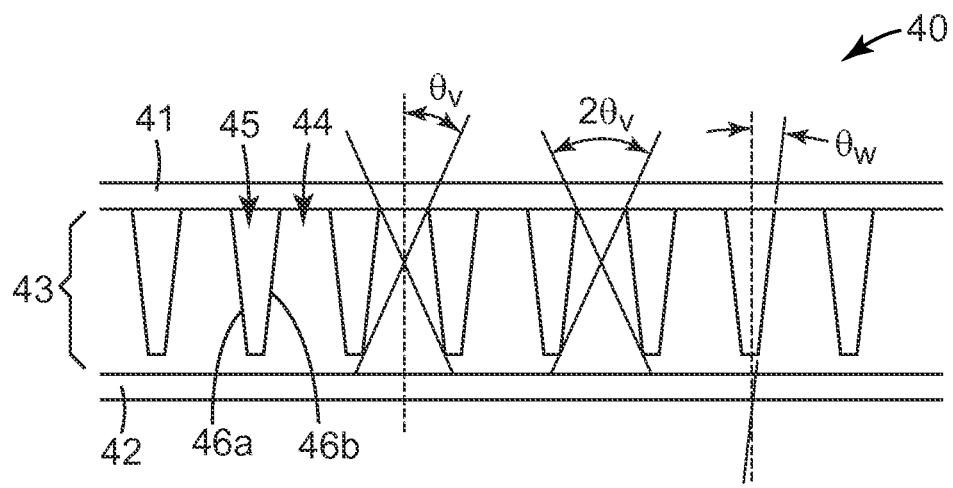

The microstructured ribs may have sides or walls that are substantially parallel to each other or they may be angled. FIG. 4 shows a schematic cross sectional view of an exemplary privacy film 40 comprising optically transparent microstructured layer 43 disposed between opposing transparent electrodes 41 and 42. The optically transparent microstructured layer comprises plurality of microstructured ribs 44 and channels 45 disposed between the ribs and comprising electronically switchable material (not shown). Each microstructured rib has angled walls 46a and 46b, and each wall has wall angle $\theta_W$. The wall angle can be used to vary the viewing angle as described, for example, in US 2010/0271721 (Gaides et al.). In some embodiments, the wall angle is less than about 6°.

The optically transparent microstructured layer is generally an optically transparent layer with desired light transmittance over a range of angles and wavelengths. The optically transparent microstructured layer can have light transmittance from about 80 to about 100% over at least a portion of the visible light spectrum (about 400 to about 700 nm). In some embodiments, the optically transparent microstructured layer has a haze value from about 0.1 to less than about 5%. In some embodiments, the optically clear microstructured layer exhibits light transmittance from about 80 to about 100% and a haze value from about 0.1 to less than about 5%.

In some embodiments, the optically clear microstructured layer has a refractive index from about 1.48 to about 1.75, or from about 1.48 to about 1.51. In some embodiments, the optically clear microstructured layer has a refractive index which closely matches that of the electronically switchable material in the presence of an electric field. For example, in some embodiments, the refractive index difference between the optically transparent microstructured layer and the electronically switchable material is less than about 0.05 when the film is in the share mode. In some embodiments, the refractive index difference between the optically transparent microstructured layer and the electronically switchable material is greater than about 0.05 when the film is in the privacy mode.

The optically transparent microstructured layer can comprise any material as long as the desired properties of the optically transparent layer are obtained. Typically, the optically transparent microstructured layer is generally made from a polymerizable composition comprising monomers which are cured using actinic radiation, e.g., visible light, ultraviolet radiation, electron beam radiation, heat and combinations thereof, or any of a variety of conventional anionic, cationic, free radical or other polymerization techniques, which can be chemically or thermally initiated.

Useful polymerizable compositions comprise curable groups known in the art such as epoxy groups, ethylenically unsaturated groups, allyloxy groups, (meth)acrylate groups, (meth)acrylamide groups, cyanoester groups, vinyl ether groups, combinations of these, and the like. The monomers used to prepare the optically clear microstructured layer can comprise polymerizable oligomers or polymers such as urethane (meth)acrylates, epoxy (meth)acrylates, polyester (meth)acrylates) as described in U.S. Pat. No. 6,398,370 B1 (Chiu et al.), US 2010/0201242 (Liu et al.), US 2010/0271721 A1 (Gaides et al.) and US 2007/0160811 A1 (Gaides et al.).

The optical film shown in FIG. 1A can be made using a coating process as described, for example, in U.S. Pat. No. 4,766,023 (Lu et al). In this process, a transparent electrode is coated with an acrylic monomer composition as described, for example, in US 2007/0160811 A1 (Gaides et al.). The composition is polymerized with high intensity UV radiation while pressed against a copper tool embossed with a microstructured pattern. The cured composition in the form of a microstructured layer is released from the tool. Release can be facilitated by use of a release agent coated on the surface of the copper tool. Release can also be facilitated by suitable design of the channels as described, for example, in U.S. Pat. No. 6,398,370 B1 (Chiu et al.) wherein the channel walls are angled at a few degrees relative to the surface normal.

The particular combination of monomers used to form the cured polymeric layer may be selected such that the modulus of the layer is low enough to enable release from the tool, but with enough cohesive strength not to break during roll to roll processing. If the cured polymeric layer is too soft, it will cohesively fail, but if it is too brittle, it will fracture or not pull out of the tool. The combination of monomers may be selected such that the cured polymeric layer sufficiently adheres to the transparent electrode on which it is formed.

In general, the electronically switchable material can comprise any electronically switchable material which is capable of modulation between high and low absorption states upon application of an electric field between the transparent electrodes. Various electronically switchable materials are known such as liquid crystals and electrochromic systems.

The electronically switchable material may comprise any suitable liquid crystals such as chiral liquid crystals, nematic liquid crystals or a combination of chiral and nematic liquid crystals. In most cases, it is desirable that the liquid crystals in the presence of the electric field exhibit substantially uniform alignment. Exemplary liquid crystals can have a chemical structure based on a core of aromatic or cycloaliphatic groups which can be connected by linkage groups and terminated by side chain and terminal groups. Cycloaliphatic components include saturated cyclohexanes, and aromatic components include phenyl, biphenyl, and terphenyl units in various combinations. Examples of side chain and terminal groups are alkyl ($C_nH_{2n+1}$), alkoxy ($C_nH_{2n+1}O$), and others such as fluoroalkoxy, acyloxyl, alkylcarbonate, alkoxycarbonyl, nitro and cyano groups. The linkage groups can contain single bonds (—C—C—) double bonds (—CH═CH—), triple bonds (—C≡C—), or any combination thereof, or may contain ester groups (O—C═O), azo (—N═N—), or Schiff base (—CH═N—) groups. Other liquid crystals which may be useful include heterocyclics, organometallics, sterols, and some organic salts of fatty acids.

Usually, in the case of liquid crystals (LC), the electronically switchable material exhibits dielectric and optical anisotropy. The dielectric behavior of liquid crystals is related to the molecules' response to an electric field. Dielectric permittivity is a physical quantity that describes how an electric field affects the said medium and is determined by the ability of the medium to polarize in response to an applied electric field. The medium reacts such that the field inside the material is partially cancelled. Dielectric anisotropy ($\Delta\in$) is defined as the difference in dielectric permittivity of the LC molecule parallel to the long axis director ($\in_|$) and the dielectric permittivity perpendicular to the LC director ($\in_\perp$), or $\Delta\in=\in_|-\in_\perp$. Therefore, the value of dielectric anisotropy can be positive or negative. LC molecules with positive dielectric anisotropy will align parallel to the direction of the electric field, whereas LC molecules with negative dielectric anisotropy will align perpendicular to the applied electric field. The magnitude of the dielectric anisotropy, i.e., the absolute value of the dielectric anisotropy, defines the sensitivity with which the molecule is able to respond to electric field, such that the greater the magnitude of the dielectric anisotropy, the lower the voltage required for switching.

There are certain optical properties which are also associated with the different orientations of the liquid crystal molecules. Due to the typically rod-like shape of liquid crystal molecules, such molecules can be characterized as having a long and short axis. The index of refraction of light is different along each axis of the liquid crystal molecule, such that the liquid crystals are said to exhibit optical anisotropy. For example, randomly oriented liquid crystal molecules have effective refractive index, $n_{eff}$. The effective refractive index is an ensemble average of characteristic ordinary ($n_o$, director parallel to long axis of molecule) and extraordinary ($n_e$, director parallel to short axis of molecule) refractive indices of the liquid crystals, wherein ($n_{eff}=(n_o+n_e)/2$). In some embodiments, the liquid crystals have a range of refractive indices from about 1.52 ($n_o$) to about 1.75 ($n_e$). Therefore, in some embodiments, $n_{eff}$ is about 1.64. The effective refractive index comes into play when no electric field is applied to the liquid crystals, as in privacy mode. When the refractive index of the liquid crystal is substantially different than that of the microstructured ribs, optical scattering between the interfaces can occur, increasing haze and decreasing the transmission of light through the film. When an electric field is applied to the liquid crystals (e.g. share mode) the long axis of the liquid crystal molecules align parallel to the electric field lines, and the ordinary refractive index ($n_o$) comes into effect. Now, the refractive index of the microstructured ribs matches closely with that of the liquid crystals, and light passes through the privacy film. This operating principle is depicted in FIG. 2.

When the electric field is not applied, the film is in a privacy mode such that it has a light transmission of less than about 10% at a viewing angle of 30°. When the electric field is applied, the film is in the share mode such that it has an increase in light transmission and the difference in transmission between the privacy mode and share mode is at least 5% for viewing angles from about 30 to about 45°. The film has a light transmission of at least about 25% in share and privacy modes at viewing angles from 0 to about 15°. The difference between the haze of the electronically switchable privacy films in privacy mode as compared to share mode in typically at least −15% (i.e. a decrease of 15%) or −20% at a viewing angle of 30 degrees. In some embodiments, the difference between the haze of the electronically switchable privacy films in privacy mode as compared to share mode is at least −30% or −35% at a viewing angle of 30 degrees. The difference in haze at 30 degree between privacy and share mode is typically no greater than −50%.

When using liquid crystals as the electronically switchable material, the electric field to which the electronically switchable material responds may be determined by the distance between the transparent electrodes which may be from about 50 to about 150 um, and the voltage applied to the electrodes which may be about 220V or less. The voltage necessary to provide the necessary electric field may be determined by the distance between the transparent electrodes and the dimensions of the channels.

The electronically switchable material may be selected such that when the electric field is applied, the electronically switchable privacy film is in the share mode such that it has an increase in light transmission and the difference in transmission between the privacy mode and share mode is at least 5% for viewing angles from about 30 to about 45°. For some embodiments, the difference is at least 6%, 7%, 8%, 9% or 10%. When in share mode, the transmission is typically at least 10% to 15% for angles ranging from 30 to 45 degrees. In some embodiments, the transmission of the privacy film in share mode is no greater than 40%, or 35%, or 30%, or 25% for angles from 30 to 45 degrees.

The electronically switchable material may comprise any suitable material which is stable under the operating conditions of the display device within which the privacy film is used. As such, suitable electronically switchable materials may be stable under continuous exposure to UV and visible light as well as radiant heat.

The liquid crystals may be used in any amount relative to the total weight of the electronically switchable material as long as the desired properties of the material can be obtained. For example, the electronically switchable material may comprise liquid crystals in an amount from about 90 to about 99 wt. % relative to the total weight of the material.

In some embodiments, the electronically switchable material comprises a "guest-host" mixture of dichroic dye mixed in with the liquid crystals. In these systems, the long axis director of the liquid crystals aligns in the direction of the field lines during electrical activation. The dye molecules rotate along with the director of the liquid crystals during electrical activation, amplifying the effect of the transmission change between the on and off states.

Suitable dichroic dyes include those having a large dielectric anisotropy due to the presence of a strong on-axis dipole moment. For example, the dielectric anisotropy of the dichroic dye may be at least that of the liquid crystals. Other desirable properties of dichroic dyes which are suitable for use in the electronically switchable material include those which are stable to continuous exposure to UV and visible light, have a high dichroic ratio, good solubility in the liquid crystalline media, and have a high extinction coefficient. Suitable dichroic dyes comprise black dyes or any combination of red, yellow, green, etc. dyes which provide absorption characteristics of a black dye. The dichroic dye may be used in any amount as long as the electronically switchable material can exhibit the desired properties, for example, from about 0.1 to about 10 wt-% relative to the total weight of the electronically switchable material.

The strength of the coupling between the liquid crystals and dye molecules is referred to as the order parameter. Perfect coupling between the liquid crystals and dye molecules is indicated by an order parameter of 1, and usually it is desirable for the order parameter to be as close to 1 as possible such that absorption of light by the dye molecules is minimal in the share mode. The order parameter may be from about 0.6 to 1.0, or from about 0.7 to about 0.9. One example of an electronically switchable material comprises a mixture of nematic liquid crystals and dichroic black dye which is available as "ZLI-4727" from Merck KGaA (Darmstadt, Germany).

The electronically switchable material may comprise a chiral dopant which lowers the threshold of voltage that needs to be applied between the transparent electrodes in order for switching between privacy and share modes. The chiral dopant may comprise a mixture of a chiral additive and nematic liquid crystals. Useful chiral dopants include those having a dielectric anisotropy greater than about 30, or from about 30 to about 80. The amount of chiral dopant used in the electronically switchable material depends on the particular nature of the material; typically, the amount of chiral dopant can be up to about 40 wt. % relative to the total weight of the electronically switchable material.

Chiral liquid crystal molecules give rise to a phase in which the molecules twist perpendicular to the director, with the molecular axis parallel to the director. The chiral pitch (p) refers to the distance over which the liquid crystal molecules undergo a full 360° twist. The pitch changes when the temperature is altered or when other molecules are added to the liquid crystal host, such as an achiral material, allowing the pitch to be tuned accordingly. In some embodiments of the switchable privacy film, the pitch length of the liquid crystal compositions may be greater than about 800 nm, for example, from about 800 to about 1500 nm, which increases absorption at all viewing angles in the absence of an electric field.

In some embodiments, the magnitude of the dielectric anisotropy for the electronically switchable material is greater than about 20, greater than about 25, or greater than about 30 as measured at 1 KHz and 20° C. In one embodiment, the electronically switchable material comprises a mixture of a first electronically switchable (e.g. liquid crystal) material having a relatively low dielectric anisotropy and a second electronically switchable (e.g. chiral dopant) material having a high dielectric anisotropy such that the magnitude of the dielectric anisotropy of the mixture is greater than about 20, greater than about 25, or greater than about 30, as previously described. The first electronically switchable (e.g. liquid crystal) material may have a dielectric anisotropy of less than 15, or 10 and the second electronically switchable (e.g. chiral dopant liquid crystal) material may have a dielectric anisotropy of at least 30, 40, 50, or 60 as measured at 1 KHz and 20° C. For example, in some embodiments, a high dielectric anisotropy material, such as "MDA-04-927" (Merck KGaA) was used in a matrix of a lower dielectric anisotropy dichroic nematic liquid crystal component, such as "ZLI-4727". However, the ZLI-4727 material by itself did not provide significant optical switching upon application of an electric field.

The electronically switchable material may also comprise a polymer-dispersed liquid crystal (PDLC) composition. PDLC constructions offer an enhancement in the durability and ease of handling of the switchable privacy film. In PDLC constructions, a mixture of a liquid crystal material solubilized in a polymerizable monomer/crosslinker/photoinitiator combination is loaded into channels of a film and cured using UV radiation. The growth in molecular weight of the polymer upon curing induces demixing, creating 'droplets' of liquid crystals dispersed in a polymer matrix. Typically, a polymer matrix is selected which features a similar refractive index ($n_p$) to the ordinary axis of the liquid crystal ($n_o=n_p$) in order to minimize haze in the share mode. The size of the liquid crystal droplets can be controlled based on the monomer functionality and intensity of radiation used for curing. If designed correctly, smaller droplet size leads to many polycrystalline regions of randomly oriented liquid crystals, higher optical scattering, and lower switching voltages. However, some polymers can exert strong "anchoring" forces on the liquid crystals inside the droplets which may increase the threshold voltage required for complete switching. In some embodiments, the polymer used in a PDLC material has a refractive index from about 1.52 to about 1.75 to match that of the liquid crystal in share mode.

Another kind of electronically switchable material useful for the switchable privacy film is an electrochromic system. Electrochromic systems comprise materials that undergo color changes under an applied electric field due to occurrence of reversible oxidation-reduction reactions involving chromophores present in the layer between the transparent electrodes. Such materials can switch between a clear or relatively low-absorbance state and a highly-colored high-absorbance state. Materials typically used in electrochromic systems include surface-bound viologen dyes, phenothiazines, diarylethenes, and conducting polymers such as polythiophenes. In general, application of the external electric field produces the color change which persists until the field is removed, at which point the system reverts to the zero-field state. Many electrochromic materials are colorless in the absence of the electric field and switch to the highly colored state when the field is applied, but some systems are known that demonstrate the opposite behavior. Photo/electrochromic systems are also known, which materials can switch between a clear state and a highly colored state upon exposure to UV radiation, then be switched back to the clear state by application of an electric field. Exemplary electrochromic systems are described in U.S. Pat. No. 6,301,038, U.S. Pat. No. 6,870,657, US 2010/0315693, and Y. Ding et al, J. Mater. Chem. 2011, 21, 11873.

The electronic stimulus that enables switching for the privacy film disclosed herein originates from the pair of opposing transparent electrodes. The transparent electrodes are substantially optically clear such that when viewing an object through the transparent electrodes, little or no distortion of the object is observed, or some acceptable level of distortion is observed. In some embodiments, a suitable transparent electrode exhibits little or no haze, meaning it may have a haze value not greater than about 10%, not greater than about 5% or not greater than about 2%. In some embodiments, the transparent substrate has high light transmittance of from about 80 to about 100% over at least a portion of the visible light spectrum (about 400 to about 700 nm). The distance between the two opposing transparent electrodes is typically from about 25 to about 150 um.

Figure 5:
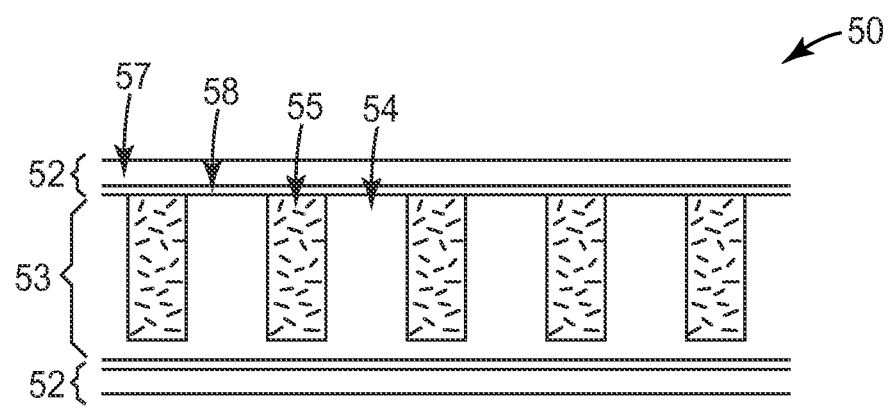
FIG. 5 shows a schematic cross sectional view of an exemplary electronically switchable privacy film.

In some embodiments, one or both of the transparent electrodes comprises a conductive layer disposed on a transparent substrate. FIG. 5 shows a schematic cross sectional view of exemplary electronically switchable privacy film 50 comprising optically transparent microstructured layer 53 disposed between opposing transparent electrodes 52. The optically transparent microstructured layer comprises plurality of microstructured ribs 54 and channels disposed between the ribs and comprising electronically switchable material 55. Each transparent electrode 52 comprises conductive layer 58 disposed on transparent substrate 57 with the conductive layer adjacent optically transparent microstructured layer 53.

The conductive layer may comprise a conductive metal oxide such asindium tin oxide (ITO), indium-doped zinc oxide, fluorine-doped tin oxide, conductive polymer such as polyaniline or poly(ethylenedioxythiophene)/polystyrene-sulfonate, nanocarbons such as carbon nanotubes or graphene, printed or self-assembled metal grids, or metallic nanowires, or combinations thereof. In some embodiments, the conductive layer comprises silver nanowires. The thickness of the conductive layer may be less than about 500 nm. In some embodiments, the conductive layer is disposed in some discontinuous form across a surface of the transparent substrate, forming a pattern comprising transparent conductive regions and transparent non-conductive regions.

In some embodiments, the transparent electrode comprises metallic nanowires disposed on a transparent substrate, and a polymeric overcoat layer is disposed on the metallic nanowires opposite the transparent substrate. Such transparent electrodes are described in U.S. Ser. No. 61/475,860 to Pellerite et al., filed Apr. 15, 2011. For example, the transparent electrode may comprise a silver nanowire layer exhibiting sheet resistance of 50-150Ω/square, overcoated with a layer of polymer to protect the silver from oxidation and to enhance adhesion of subsequently-applied optically transparent layer. In addition, the silver nanowire-based transparent electrodes can offer high transmission levels at lower sheet resistance in comparison with other conductive materials.

The polymeric overcoat layer may comprise the reaction product of a multifunctional (meth)acrylate, such as the reaction product of a multifunctional (meth)acrylate and a urethane (meth)acrylate oligomer. In some embodiments, the polymeric overcoat layer comprises a polymer such as methyl (meth)acrylate polymer and the reaction product of a multifunctional (meth)acrylate. Particular examples of materials which may be used in the polymeric overcoat layer include pentaerythritol triacrylate (SR 444C from Sartomer Co.), hexanediol diacrylate, urethane acrylate oligomers (CN 981 B88 from Sartomer Co.), Ucecoat® 7655 and 7689 from Cytec Industries, polymethylmethacrylates (for example Elvacite® 2041 available from Lucite International, Inc.), polystyrenes, and polyvinylbutyrals (for example Butvar® polymers available from Solutia Inc.). The polymeric overcoat layer may comprise nanoparticles having a diameter from about 10 to about 500 nm, at a weight ratio of about 85:15 to about 25:75 polymer nanoparticles. In general, the thickness of the polymeric overcoat layer is from about 50 nm to about 1 um.

As described in Pellerite et al., the polymeric overcoat layer may comprise nanoparticles selected from the group consisting of antimony tin oxide, zinc oxide and indium tin oxide; and the sheet resistance of the polymeric overcoat layer disposed on the transparent substrate without the conductive layer is greater than about $10^7 \Omega$/sq.

The transparent substrate can comprise any useful material such as, for example, polymer, glass, ceramic, metal, metal oxide, or a combination thereof. Examples of polymers that may be used as the transparent substrate include thermoplastic polymers such as polyolefins, poly(meth)acrylates, polyamides, polyimides, polycarbonates, polyesters, and biphenyl- or naphthalene-based liquid crystal polymers. Further examples of useful thermoplastics include polyethylene, polypropylene, polystyrene, poly(methylmethacrylate), bisphenol A polycarbonate, poly(vinyl chloride), polyethylene terephthalate, polyethylene naphthalate, cellulose acetates and poly(vinylidene fluoride). Some of these polymers also have optical properties (e.g., transparency) that make them especially well-suited for certain display applications wherein they would support a patterned conductor, such as polycarbonates, and/or polyesters. The transparent substrate may have any useful thickness, ranging from about 5 μm to about 1000 μm.

The electronically switchable privacy film comprises exposed conductive material on both the top and bottom of the film to enable electrical contact via silver paste or another suitable conductor material with the transparent electrodes. A positive bias is applied to one conductor, while a negative bias (or ground terminal) is applied to the other conductor, or vice versa. The potential difference between the two transparent electrodes enables the electric field which is used to energize the electronically switchable material for switching between privacy and share modes.

Also disclosed herein is an electronically switchable privacy film device comprising the electronically switchable privacy film and circuitry for supplying the electric field. Circuitry may include transformers, amplifiers, rectifiers, diodes, resistors, capacitors, transistors and the like.

Also disclosed herein is a display device comprising an electronically switchable privacy film, as described herein. In general, the display device comprises some type of light transmissive display panel such as a liquid crystal display (LCD) panel. LCD devices typically comprise an outer substrate or light output substrate adjacent the light transmissive display panel and providing a viewing surface.

Figure 9:
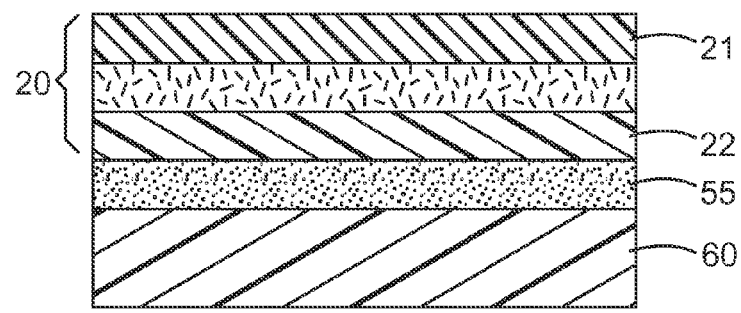
FIG. 9 is a cross-sectional view of an electron display device comprising an electronically switchable privacy film.

In some embodiments, the electronically switchable privacy film is disposed on the viewing surface, for example, as applied by a consumer. For example, the device could be hung on the front of the display using an additional bezel with built-in circuitry required to operate the device. The bezel may include built-in circuitry as required to operate the device. Alternatively, the bezel may simply provide a means for attaching the electronically switchable privacy film to the display device. In this embodiment, the circuitry required to operate the electronically switchable privacy film may be a toggle on a cord that engages with a USB port of the display device. Alternatively, the software of the display device, for example by means of a key stroke(s) or a mouse click, could control the voltage between privacy and share mode. In another embodiment, the electronically switchable privacy film 20 may be attached to the display using an optically clear adhesive 55, such as shown in FIG. 9.

The circuitry is an integral part of the device construction. In any of the above embodiments, it is possible to split the "hot lead" positive bias from the AC receptacle of a computer monitor into two wires, one going into the display, and the other going to the positive contact of the electronically switchable privacy film. The negative bias electrode can be attached to a metal ground. Alternately, power can be drawn from a battery, or a USB port rated at 5V, 500 milliamps. The voltage can be suitably upconverted using transformer circuitry to generate a sufficient high voltage, low current switching waveform that will enable complete switching of the electronically switchable material. In the "on" state (share mode), the current used to operate the display device can be very low, on the order of 1-3 milliamps. Thus, using a voltage equal to 120V, the total power consumed would be on the order of hundreds of milliwatts, if share mode is kept on.

A square wave frequency pattern may be used and can provide the highest efficiency in switching behavior. This is because a square wave power source reverses its polarity almost instantaneously, such that liquid crystals do not have time to switch between distorted and aligned states, and the match between $n_o$ and $n_p$ is maintained during each cycle of the applied field; see, for example, U.S. Pat. No. 5,156,452 (Drzaic et al.).

Figure 7:
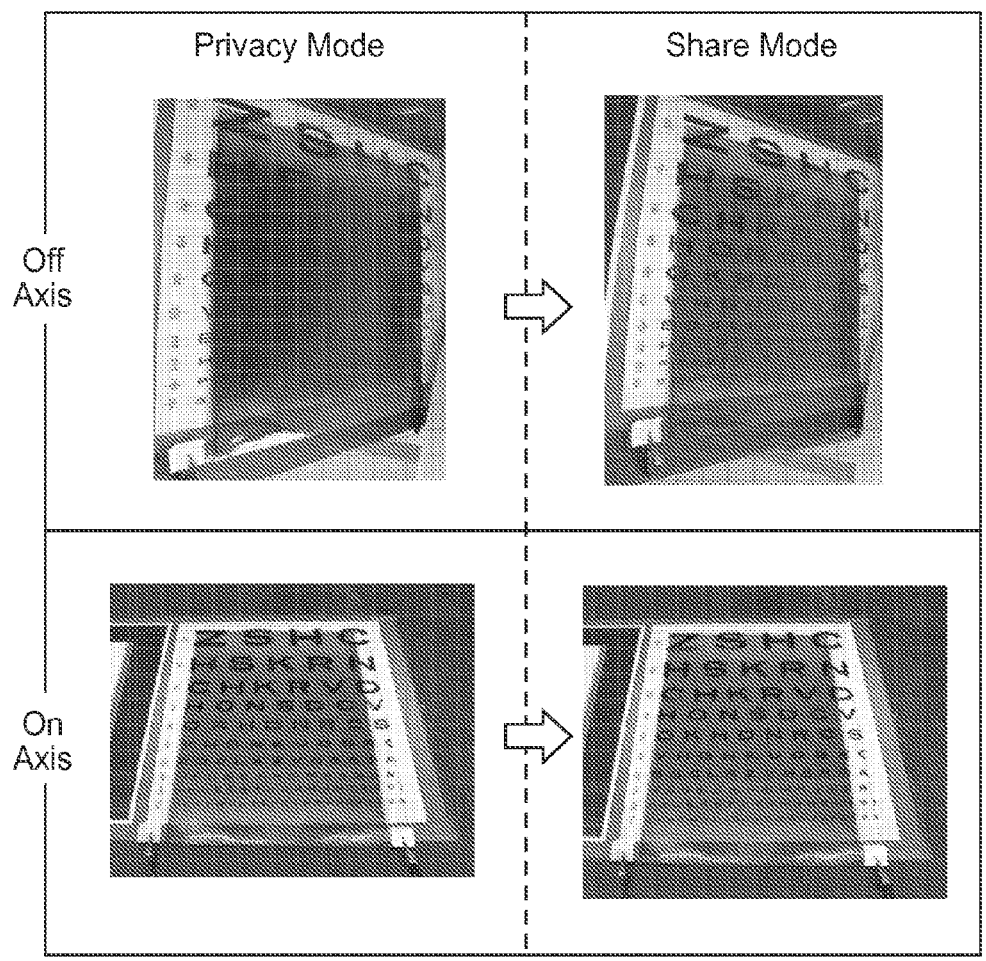
FIG. 7 shows images of an exemplary electronically switchable privacy film used with a standard eye chart.

FIG. 7 shows images of an exemplary electronically switchable privacy film used with a standard eye chart. In the privacy mode, as shown in the upper left hand quadrant, an observer positioned at some off-axis angle relative to the normal of the privacy film is not able to view letters behind the film. An electronic switch is activated such that the privacy film is electronically switched to a share mode, and as shown on the right, letters behind the film can be seen. From an on-axis position (zero degree angle relative to the normal of the film), letters behind the film can be seen in both privacy and share modes regardless of whether or not the privacy film has been electronically switched.

Figure 8:
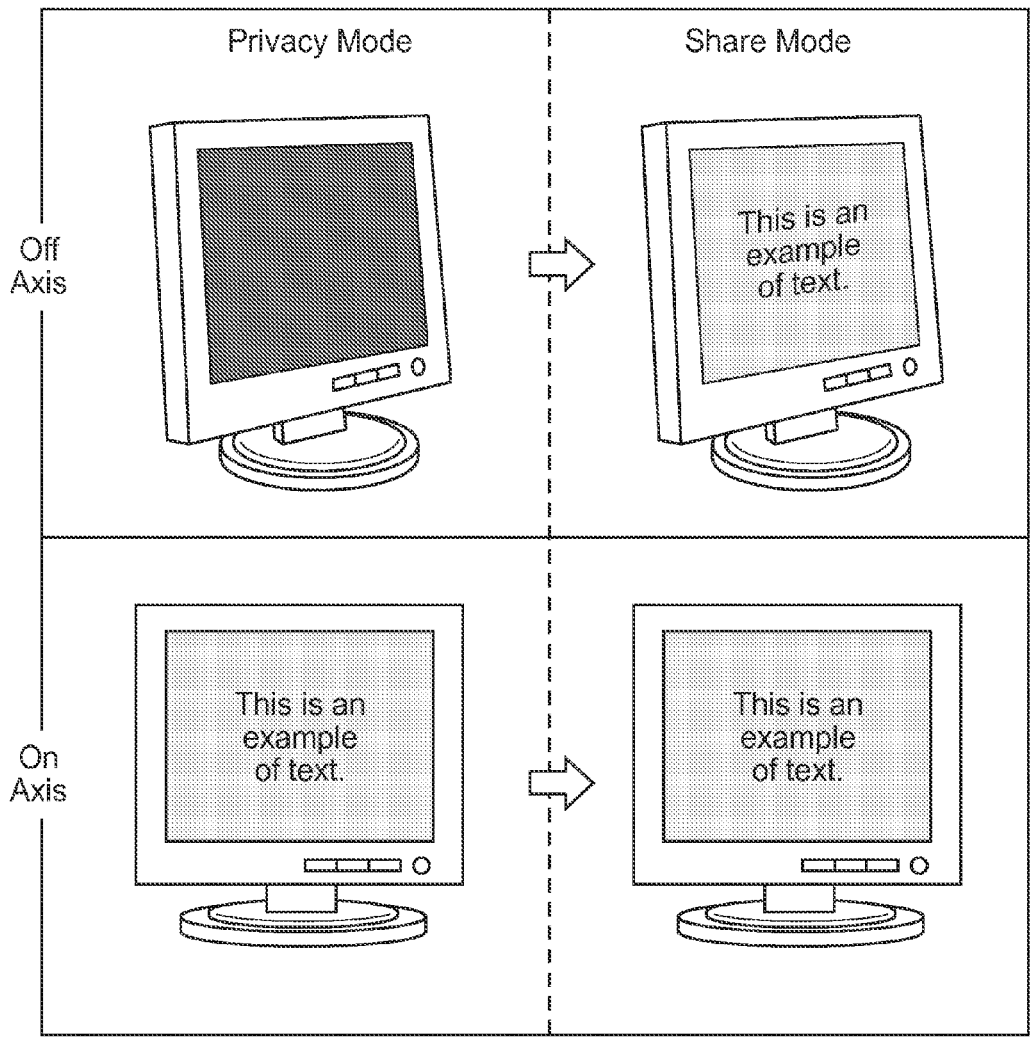
FIG. 8 shows schematic representations of an exemplary electronically switchable privacy film used with an exemplary electronic display device.

FIG. 8 shows schematic representations of an exemplary electronically switchable privacy film used in conjunction with an electronic display device. In this representation, either the privacy film is disposed on the viewing surface of the device, or it is contained within the device, for example, between the liquid crystal display panel and a substrate that forms the outer viewing surface. In the privacy mode, as shown in the upper left hand quadrant of the representation, an observer positioned at some off-axis angle relative to the normal of the viewing surface is not able to view contents being displayed. The user of the device activates an electronic switch such that the privacy film is electronically switched to a share mode, shown on the right, and the observer is able to view contents being displayed without having to reposition himself. The user is positioned on-axis or at zero degree angle relative to the normal of the viewing surface, and contents being displayed by the device are viewable in both privacy and share modes regardless of whether or not the privacy film has been electronically switched.

EXAMPLES

Preparation of Transparent Electrodes

Transparent electrodes were prepared as described in Examples 15-18 of U.S. Ser. No. 61/475,860 to Pellerite et al., filed Apr. 15, 2011. A silver nanowire ink prepared using the methods disclosed in Example 5 of WO 2008/046058 (Allemand et al.) was coated on 5 mil PET film (Melinex® 618 from DuPont Teijin Films) using a 9 inch die coater operating at a web speed of 15 ft/min, ink flow rate of 15.5 cc/min, drying oven airflow 19.7 m/sec, and drying oven temperatures of 105° F. (Zone 1) and 175° F. (Zone 2) and 250° F. (Zone 3). Sheet resistance of the resulting coating was 60-100Ω/sq using a contactless probe (Delcom 717R Non-Contact Conductance Monitor from Delcom Products Inc.), and transmission and haze measured on a Haze-Gard Plus haze meter (BYK-Gardner USA) were found to be 90-92% and 1.4-1.6%, respectively.

A polymeric overcoat solution was prepared as follows. A concentrate was prepared by dissolving an 85:15 (w:w) mixture of pentaerythritol triacrylate (SR 444 from Sartomer Co.) and methyl methacrylate polymer (Elvacite® 2041 from Lucite International, Inc.) in acetone to 10 wt % total solids. Photoinitiator (Irgacure® 651 from Ciba Specialty Chemicals) was added at 0.2 wt % total solids. The polymeric overcoat solution was prepared by combining ATO Sol (nominal 30 wt. % antimony tin oxide (ATO) nanoparticles in IPA from Advanced Nano Products, Korea) and the above 10 wt. % concentrate, in amounts to give a 25:75 weight ratio of ATO:organic solids, and diluting the resulting mixture to 5 wt % total solids using 1:1 IPA:diacetone alcohol.

The polymeric overcoat solution was coated on top of the conductor layer. Coating was performed on a 9 inch die coater used for the ink coating, using the above oven and air flow settings, web speed of 20 ft/min, solution flow rates of 18 cc/min, UV plate temperature of 70° F., nitrogen atmosphere, and 100% UV lamp power. Transmission and haze were measured at 87.5 and 1.17%, respectively, using a BYK- Gardner HazeGard Plus. The sheet resistance was measured at 72.3Ω/sq using the Delcom system described above.

Optically Clear Microstructured Layer

Properties of optically clear microstructured layers employed in the examples are shown in Table 1.

TABLE 1

Properties of Optically Clear Microstructured Layers

| Example | Rib, Channel Height H | Pitch P | Rib Width W | Channel Width P – W | Rib Aspect Ratio H/W | Channel Aspect Ratio H/(P – W) |
|---|---|---|---|---|---|---|
| 1 | 75 | 33 | 30 | 3 | 2.5 | 25 |
| Comp. 1 | 25 | 35 | 25 | 10 | 1 | 2.5 |
| Comp. 2 | 4 | 6 | 4 | 2 | 1 | 2 |
| Comp. 3 | 75 | 33 | 30 | 3 | 2.5 | 25 |
| 2 | 75 | 33 | 30 | 3 | 2.5 | 25 |

Electronically Switchable Material

Properties of electronically switchable materials employed in the examples are shown in Table 2.

TABLE 2

Properties of Electronically Switchable Materials

| Property | MDA-04-927 | ZLI-4727 | 1:2 Mixture, GHLC of Table 2 | BLO-36, used in Comparative Example 3 |
|---|---|---|---|---|
| $\Delta\epsilon$* | 68.2 | 6.00 | 26.7 | 16.6 |
| $\epsilon_\parallel$* | 78.8 | 9.60 | 32.6 | 21.7 |
| $\epsilon_\perp$* | 10.6 | 3.60 | 5.93 | 5.06 |
| $n_e$** | 1.75 | 1.63 | 1.67 | 1.79 |
| $n_o$** | 1.52 | 1.50 | 1.51 | 1.52 |
| $\Delta n$** | 0.23 | 0.13 | 0.16 | 0.27 |

*Measured at 1 kHz and 20° C.
**Measured at 589 nm and 20° C.

Example 1

A microstructured film was prepared by molding and UV curing an acrylate resin formulation on a first transparent electrode using a roll-to-roll web coating process. The acrylate resin is described in US 2007/0160811 A1 (Gaides et al.) The first transparent electrode was prepared as described above, and the microstructured film was formed on the polymeric overcoat. The web speed used was 10 ft/min, with the imprinting tool operating at 110° F., curing using two banks of Fusion high intensity UV D-bulb lamps operating at 100% power. An annealing oven was set for 200° F., at a four foot length. The resulting structure of the cured acrylate consisted of regularly spaced channels each having a nominally rectangular cross-section, as described in Table 1. The channels were filled with the electronically switchable material GHLC-1 described in Table 3, which was heated to 90° C. in order to reduce viscosity.

TABLE 3

Guest-Host Liquid Crystal Composition (GHLC-1)

| Material | Weight % |
|---|---|
| MDA-04-927 (Merck KGaA) | 35 |
| ZLI-4727 (Merck KGaA) | 65 |

A second transparent electrode was laminated over the top of the filled channels using a flat-bed laminator operating at 0.167 inches/minute, and a nip pressure of 25 psi. The top sheet (second transparent electrode) was offset cross-web from the bottom sheet (first transparent electrode), to enable easier access to electrical contact pads. Excess switchable material was left at the start and end of the lamination to prevent air bleed and maximize capillary filling of the channels. A colloidal dispersion of silver particles (Ted Pella, Inc.) was applied onto the exposed electrode pads to allow for electrical contact to the transparent conductor. The film construction was left to equilibrate to room temperature before optical testing. Testing was performed by applying positive and negatively charged bias voltages to the dried silver paste contacts from an electrical power source via two alligator clips.

Figure 6:
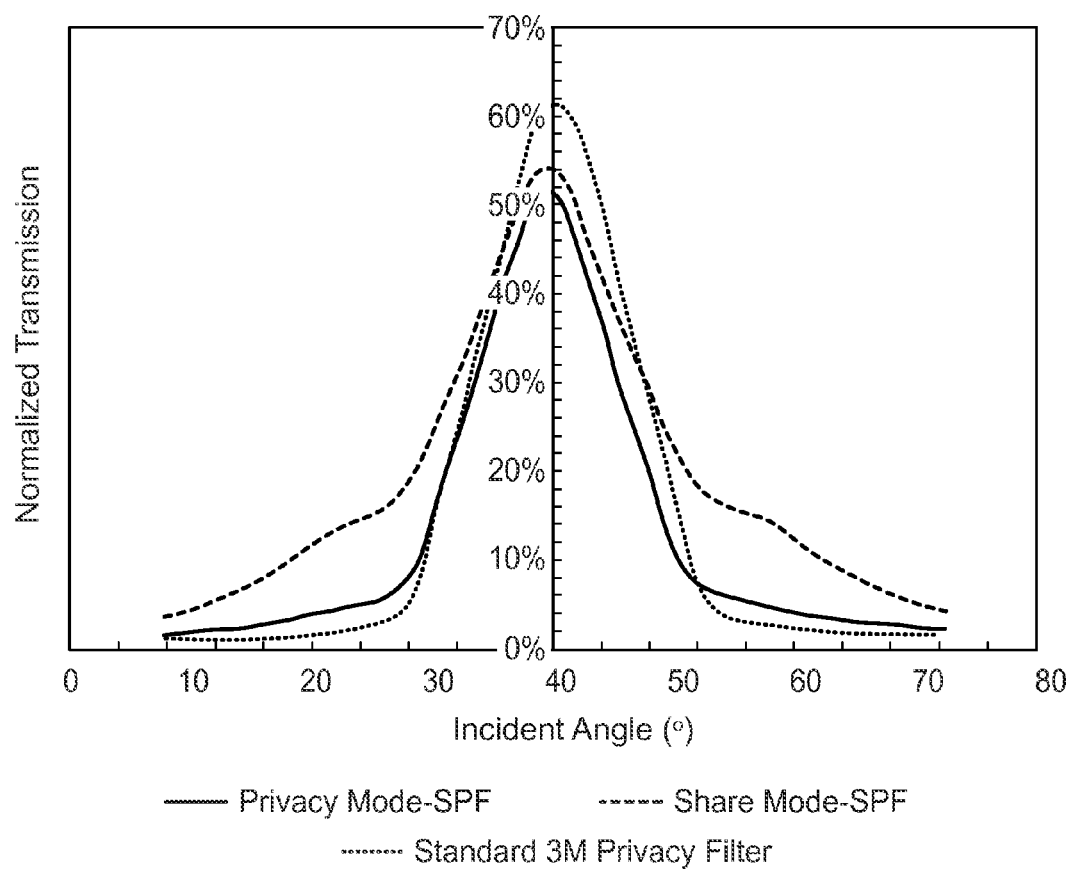
FIG. 6 shows normalized transmission as a continuous function of viewing angle for the electronically switchable privacy film of Example 1.

Light transmission as a function of viewing angle was measured for the film construction using an Eldim 80 Conoscope (Eldim Corp., France). The film was placed on top of a diffusively transmissive hollow light box. The luminance (cd/m$^2$, or "nits", i.e. brightness) profiles of the light box with the film was measured. The diffuse transmission of the light box can be described as Lambertian. The light box was a six-sided hollow cube measuring approximately 12.5 cm×12.5 cm×11.5 cm (L×W×H) made from diffuse polytetrafluoroethylene (PTFE) plates of ~6 mm thickness. One face of the box was chosen as the sample surface. The hollow light box had a diffuse reflectance of ~0.83 measured at the sample surface (e.g. ~83%, averaged over the 400-700 nm wavelength range). During the testing, the box was illuminated from within through an approximately 1 cm circular hole in the bottom of the box (opposite the sample surface, with the light directed toward the sample surface from inside). The illumination was provided using a stabilized broadband incandescent light source attached to a fiber-optic bundle used to direct the light (Fostec DCF-II with a 1 cm diameter fiber bundle extension from Schott-Fostec LLC, Marlborough, Mass. and Auburn, N.Y.). An Eldim 80 Conoscope was used to measure the luminance (brightness) profiles of the diffuse light source both with and without the light control filters. A slice along the meridian of the conoscope image shows the transmission as a continuous function of viewing angle and this data is shown in FIG. 6.

Light transmission was determined as a function of viewing angle for the switchable privacy filter oriented with the louvers facing up (closest to the Conoscope measurement), in both privacy and share mode. A commercially available light control film (Vikuiti™ advanced light control film, available from 3M Company) was used as a reference to compare against the privacy mode of the switchable light control filter. Normalized transmission was measured by dividing the luminance of the light control films in each mode by the luminance of the hollow light box.

Transmission and haze data were measured using a Haze-Gard Plus instrument, with a measurement area of 18 mm. The Haze-Gard Plus transmittance measurement is an average of the total transmittance of light across 380-720 nm, weighted according the CIE Illuminant "C". The film construction was clipped to a rotational stage and placed midway between the light source and detector. Data was taken at 15 degree intervals up to 60 degrees and are reported in Table 4.

TABLE 4

Optical Properties of Switchable Privacy Film of Example 1

| View Angle (°) | Privacy Mode (Off State, 0 V) | | Share Mode (On State, 120 V*) | | $\Delta T$ ($T_{on} - T_{off}$) | $\Delta H$ ($H_{on} - H_{off}$) |
|---|---|---|---|---|---|---|
| | Transmission (%) | Haze (%) | Transmission (%) | Haze (%) | | |
| 0 | 48 | 7.0 | 50 | 9.0 | 2.0 | 2.0 |
| 15 | 31 | 9.0 | 37 | 11 | 6.0 | 2.0 |
| 30 | 6.0 | 53 | 18 | 18 | 12 | −35 |
| 45 | 2.0 | 63 | 12 | 14 | 10 | −49 |
| 60 | 1.0 | 57 | 9.0 | 18 | 8.0 | −39 |

*sine wave 60 Hz AC

Comparative Example 1

An electronically switchable privacy film was prepared as described for Example 1 except the microstructured film consisted of regularly spaced channels as described in Table 1. The liquid crystal material used was ZLI-4727, without the chiral dopant MDA-04-927. Testing was carried out using the Haze-Gard Plus haze meter as described for Example 1; data are reported in Table 5. In the privacy mode, the transmission was higher than Example 1 at viewing angles of 30° and 40°. Further, the difference in transmission at these angles between privacy mode and share mode was much lower than Example 1.

TABLE 5

Optical Properties of Switchable Privacy Film of Comparative Example 1

| View Angle (°) | Privacy Mode (Off State, 0 V) | | Share Mode (On State, 120 V*) | | $\Delta T$ ($T_{on} - T_{off}$) | $\Delta H$ ($H_{on} - H_{off}$) |
|---|---|---|---|---|---|---|
| | Transmission (%) | Haze (%) | Transmission (%) | Haze (%) | | |
| 0 | 38 | 13 | 39 | 11 | 1.0 | −2.0 |
| 15 | 27 | 19 | 30 | 16 | 3.0 | −3.0 |
| 30 | 15 | 29 | 18 | 18 | 3.0 | −11 |
| 45 | 8.0 | 24 | 10 | 16 | 2.0 | −8.0 |
| 60 | 6.0 | 28 | 6.0 | 16 | 0.0 | −12 |

*sine wave 60 Hz AC

Comparative Example 2

A comparative film was prepared as described for Example 1 except the microstructured film consisted of regularly spaced channels as described in Table 1. ZLI-4727 was loaded into the channels without chiral dopant "MDA-04-927." Here the height of the channels did not allow enough loading of liquid crystals to effectively hide the display in the privacy mode. In share mode, some switching of the liquid crystalline material was observed, but the effect was not significant since the privacy mode was ineffective.

Comparative Example 3

A comparative film was prepared as described for Example 1 except that the electronically switchable material did not have a dichroic dye, nor does it have as high of a dielectric anisotropy as GHLC-1. The switchable material was a liquid crystalline material, from EM Industries, Hawthorne, N.Y., available under the trade designation "BLO-36", having electronically switchable properties as depicted in Table 2. The microstructured film consisted of regularly spaced channels as described in Table 1. Testing was carried out using the Haze-Gard Plus haze meter as described for Example 1; data are reported in Table 6. Although the switch in transmission was high (15%) the transmission in privacy mode was high (39%) at a viewing angle of 45°. Thus, this example exhibited undesirable optical properties and obviated the need for the inclusion of dichroic dye to block more light in privacy mode.

TABLE 6

Optical Properties of Switchable Privacy Film of Comparative Example 3

| View Angle (°) | Privacy Mode (Off State, 0 V) | | Share Mode (On State, 120 V*) | | $\Delta T$ ($T_{on} - T_{off}$) | $\Delta H$ ($H_{on} - H_{off}$) |
|---|---|---|---|---|---|---|
| | Transmission (%) | Haze (%) | Transmission (%) | Haze (%) | | |
| 0 | 62 | 38 | 67 | 33 | 5.0 | −5.0 |
| 15 | 50 | 40 | 61 | 38 | 11 | −2.0 |
| 30 | 43 | 53 | 59 | 37 | 16 | −16 |
| 45 | 39 | 59 | 55 | 37 | 16 | −22 |
| 60 | 30 | 71 | 43 | 54 | 13 | −16 |

*sine wave 60 Hz AC

Table 7 summarizes properties and performance of privacy films prepared according to Example 1 and Comparative Examples 1-3.

TABLE 7

Properties and Performance of Privacy Films

| Example | Rib, Channel Height H | Rib Aspect Ratio H/W | Channel H/(P − W) | $\Delta\epsilon$ | % Transmission Privacy Mode at 45° | Share Mode at 45° | Delta |
|---|---|---|---|---|---|---|---|
| 1 | 75 | 2.5 | 25 | 27 | 2.0 | 12 | 10 |
| Comp. 1 | 25 | 1.0 | 2.5 | 27 | 8.0 | 10 | 2.0 |
| Comp. 2 | 4.0 | 1.0 | 2.0 | 27 | N/M* | N/M | N/M |
| Comp. 3 | 75 | 2.5 | 25 | 17 | 39 | 55 | 16 |

*not measured - privacy mode not observed

Example 2

An electronically switchable privacy film was prepared as described for Example 1 except GHLC-1 described by Table 2 was replaced with a UV curable guest-host liquid crystal mixture GHLC-2 reported in Table 8 with subsequent curing in a custom-built UV radiation chamber at 3 mW/cm² for 30 minutes to form a polymer-dispersed liquid crystal formulation. Testing was carried out as described for Example 1; Haze-Gard Plus data are reported in Table 9. Performance was similar to Example 1, except for a slightly less transmissive share mode from the 45° viewing angle.

TABLE 8

Guest-Host Liquid Crystal Composition (GHLC-2)

| Material | Weight % |
|---|---|
| MDA-04-927 | 26.6 |
| ZLI-4727 | 53.3 |
| n-butyl methacrylate (n-BMA, Aldrich) | 15.4 |

TABLE 8-continued

Guest-Host Liquid Crystal Composition (GHLC-2)

| Material | Weight % |
|---|---|
| ethylene glycol diacrylate (EGDA, Aldrich) | 4.60 |
| Irgacure ® 819 | 0.30 |

TABLE 9

Optical properties of switchable privacy film of Example 2

| View Angle (°) | Privacy Mode (Off State, 0 V) | | Share Mode (On State, 120 V*) | | ΔT ($T_{on} - T_{off}$) | ΔH ($H_{on} - H_{off}$) |
|---|---|---|---|---|---|---|
| | Transmission (%) | Haze (%) | Transmission (%) | Haze (%) | | |
| 0 | 54 | 12 | 55 | 12 | 1.0 | 00 |
| 15 | 33 | 9.0 | 38 | 9.0 | 5.0 | 0.0 |
| 30 | 5.0 | 58 | 16 | 23 | 11 | −35 |
| 45 | 2.0 | 76 | 11 | 23 | 9.0 | −53 |
| 60 | 1.0 | 81 | 6.0 | 31 | 5.0 | −50 |

*sine wave 60 Hz AC

Although specific embodiments have been illustrated and described herein, it will be appreciated by those of ordinary skill in the art that a variety of alternate and/or equivalent implementations can be substituted without departing from the spirit and scope of the invention.

What is claimed is:

1. An electronically switchable privacy film comprising:
a pair of mutually opposing transparent electrodes;
an optically transparent microstructured layer disposed between the transparent electrodes, the microstructured layer comprising a plurality of microstructured ribs extending across a surface thereof such that the microstructured ribs form an alternating series of ribs and channels;
electronically switchable material disposed in the channels, the electronically switchable material being capable of modulation between high and low absorption states upon application of an electric field across the transparent electrodes;
wherein:
when the electric field is not applied, the film is in a privacy mode such that it has a light transmission of less than about 10% at a viewing angle of 30°;
when the electric field is applied, the film is in the share mode such that it has an increase in light transmission and the difference in transmission between the privacy mode and share mode is at least 5% for viewing angles from about 30 to about 45°,
the film has a light transmission of at least about 25% in share and privacy modes at viewing angles from 0 to about 15°.

2. The electronically switchable privacy film of claim 1, wherein the electronically switchable material comprises a liquid crystal or electrochromic material.

3. The electronically switchable privacy film of claim 1, wherein the electronically switchable material comprises a mixture of liquid crystals and dichroic dye.

4. The electronically switchable privacy film of claim 1, wherein the electronically switchable material comprises a mixture of chiral liquid crystals and dichroic dye.

5. The electronically switchable privacy film of claim 1, wherein the electronically switchable material comprises a mixture of nematic liquid crystals and dichroic dye.

6. The electronically switchable privacy film of claim 1, wherein the electronically switchable material comprises a mixture of chiral liquid crystals, nematic liquid crystals and dichroic dye.

7. The electronically switchable privacy film of claim 6, wherein the electronically switchable material has a pitch length of about 800 to about 1500 nm.

8. The electronically switchable privacy film of claim 1, wherein the electronically switchable material comprises liquid crystals and dichroic dye dispersed in a polymer matrix.

9. The electronically switchable privacy film of claim 1, wherein a magnitude of the dielectric anisotropy for the electronically switchable material is greater than about 20.

10. The electronically switchable privacy film of claim 1 wherein the electronically switchable material comprises an electronically switchable material having a dielectric anisotropy of at least 20, 30, 40, 50, or 60.

11. The electronically switchable privacy film of claim 1, wherein the electronically switchable material has a refractive index from about 1.52 to about 1.75.

12. The electronically switchable privacy film of claim 1, wherein each rib has height H, width W and rib aspect ratio H/W greater than about 1.5.

13. The electronically switchable privacy film of claim 1, wherein each channel has height H, width Y and channel aspect ratio H/Y greater than 5.

14. The electronically switchable privacy film of claim 1, wherein the optically transparent microstructured layer has a refractive index from about 1.48 to about 1.75.

15. The electronically switchable privacy film of claim 1, wherein the difference between the refractive indices of the electronically switchable material and the optically transparent microstructured layer is less than about 0.05 when the privacy film is in the share mode.

16. The electronically switchable privacy film of claim 1, wherein the difference between the refractive indices of the electronically switchable material and the optically transparent microstructured layer is greater than about 0.05 when the privacy film is in the privacy mode.

17. The electronically switchable privacy film of claim 1, wherein each transparent electrode comprises a conductive layer disposed on a transparent substrate, and each conductive layer is adjacent opposing major surfaces of the optically transparent microstructured layer.

18. A display device comprising:
a light transmissive display panel,
a light output substrate adjacent the light transmissive display panel, the light output substrate comprising a viewing surface opposite the light transmissive display panel, and
the electronically switchable privacy film of claim 1 disposed on the viewing surface.

19. A display device comprising:
a light transmissive display panel,
a light output substrate adjacent the light transmissive display panel, the light output substrate comprising a viewing surface opposite the light transmissive display panel, and
the electronically switchable privacy film of claim 1 disposed between the light transmissive display panel and the light output substrate.

20. The display device of claim 19, wherein the light output substrate comprises a touch screen.

* * * * *